United States Patent [19]
Iwamoto et al.

[11] Patent Number: 5,621,865
[45] Date of Patent: Apr. 15, 1997

[54] GRAPHICS PROCESSING APPARATUS USING GRID AND A METHOD THEREOF

[75] Inventors: Naoki Iwamoto, Yokohama; Toshio Abe, Yachiyo; Hiroyuki Sakai, Yokohama, all of Japan

[73] Assignee: Canon Kabushiki Kaisha, Tokyo, Japan

[21] Appl. No.: 688,217

[22] Filed: Jul. 29, 1996

Related U.S. Application Data

[63] Continuation of Ser. No. 175,754, Dec. 30, 1993, abandoned.

[30] Foreign Application Priority Data

Jan. 18, 1993 [JP] Japan .................................. 5-006116

[51] Int. Cl.$^6$ ................................................ G06F 15/00
[52] U.S. Cl. ............................................................. 395/119
[58] Field of Search ................................... 395/119, 133, 395/129; 345/118

[56] References Cited

PUBLICATIONS

Evolution Computing; Easycad; Version 1.08; Jun. 1987; pp. 41–42, 61–62, 119–119, 179, 226–229.

Fuller, James E.; Using Autocad: Release 10 with 3–D; Third Edition; 1989; pp. 1–2 to 1–3, 5–1 to 5–3; 6–14 to 6–15, 8–6 to 8–7, 11–9 to 11–10, 11–24 to 11–25, 18–4 to 18–8, 18–13.

*Primary Examiner*—Phu K. Nguyen
*Attorney, Agent, or Firm*—Fitzpatrick, Cella, Harper & Scinto

[57] ABSTRACT

The present invention relates to a graphics processing apparatus for plotting three-dimensional graphics by using a grid, and to a method of use of the apparatus. An arbitrary plane grid is displayed on a display screen, the displayed grid is variously changed and the three-dimensional graphic is plotted using the changed grid. The possible changes of the grid include a grid translation, a grid spacing change, a grid rotation, the selection of a grid display/non-display mode, coincidence/non-coincidence of the reference points of the graphic with the grid, and the like. Also, the apparatus executes a corner processing, including arc processing and straight line processing. In the arc processing, the corner processing is executed by selecting two straight lines and inputting a radius to define a corner joining the two lines; and in the straight line processing, the corner processing is executed by selecting two straight lines and inputting the length and angle of a line segment to join them.

20 Claims, 17 Drawing Sheets

| FIG. 2A |
| FIG. 2B |

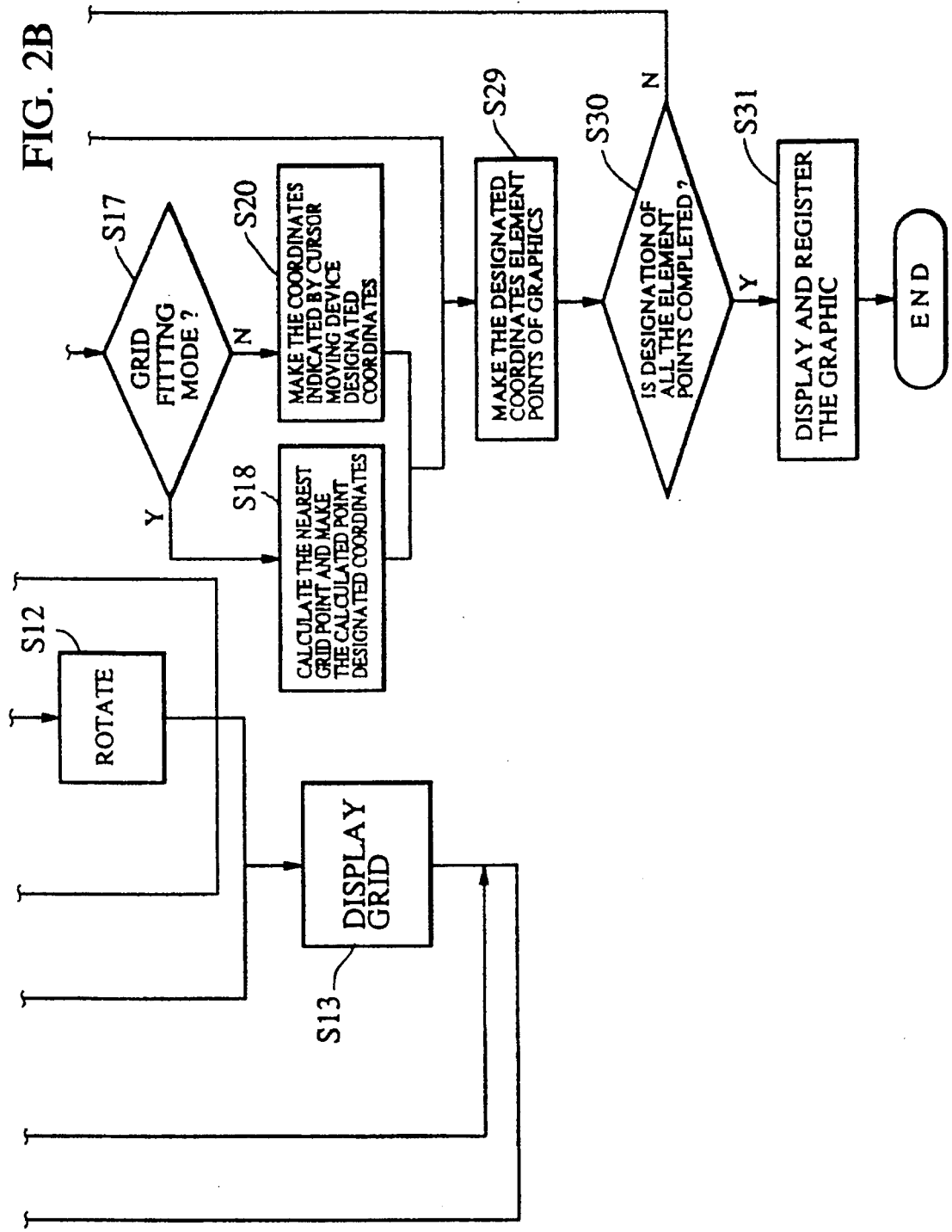

GRAPHICS PROCESSING APPARATUS USING GRID AND A METHOD THEREOF

This application is a continuation of application Ser. No. 08/175,754, filed Dec. 30, 1993, now abandoned.

BACKGROUND OF THE INVENTION

1. Field of the Invention

The present invention relates to a graphics processing apparatus for designating coordinates by using a grid and a method of use thereof, and more specifically, to a graphics processing apparatus using a three-dimensional grid point input in CADs and the like and a method of use thereof.

2. Description of the Related Art

Conventionally, a grid used in a graphics processing apparatus for designating coordinates by using the grid is two-dimensionally represented. Therefore, an arc connecting a straight line to a straight line is two-dimensionally represented. Further, the angle and length of a straight line by which a straight line is connected to a straight line are two-dimensionally represented.

Since the grid is two-dimensionally represented in the aforesaid conventional graphics processing apparatus for designating coordinates by using the grid, it is difficult to plot three-dimensional graphics.

Further, when a corner processing is executed, since an arc is two-dimensionally represented, an operator must plot a three-dimensional arc or an ellipse from the radius of the arc and the like. Therefore, it is difficult to plot a graphic having a three-dimensionally processed corner.

Furthermore, when the corner processing is executed, since the angle and length of a straight line are two-dimensionally represented, an operator must convert the angle and length of the straight line in order to plot a three-dimensional graphic from the angle and length of the straight line with respect to a grid being processed. Therefore, it is time-consuming to plot a graphic with a three-dimensionally processed corner.

SUMMARY OF THE INVENTION

Taking the above into consideration, an object of the present invention is to provide a graphics processing apparatus by which a three-dimensional graphics can be easily plotted.

A further object of the present invention is to provide a graphics processing apparatus by which corners of three-dimensional graphics can be easily processed.

A graphics processing apparatus according to the present invention for plotting a graphic by using a grid comprises a grid display means for displaying the grid of an XY plane, YZ plane or ZX plane on a display means; a grid change means for changing the grid displayed on the display means; and a graphics plotting means for plotting the graphic by using the changed grid.

Further, a graphics plot apparatus according to the present invention for designating coordinates by using grid points comprises a display control means for displaying a grid on a display means; a segment plot means for plotting line segments on the displayed grid; a selection means for selecting a line segment for executing corner processing; a type selection means for selecting a type of corner processing; and a processing means for executing the corner processing on the selected line segments based on the selected type.

With the above arrangement, a three-dimensional graphic can be easily plotted. Further, the corner of a three dimensional graphic can be easily plotted.

DESCRIPTION OF THE PREFERRED EMBODIMENT

An embodiment of the present invention will be described in detail with reference to the drawings.

Figure 1:
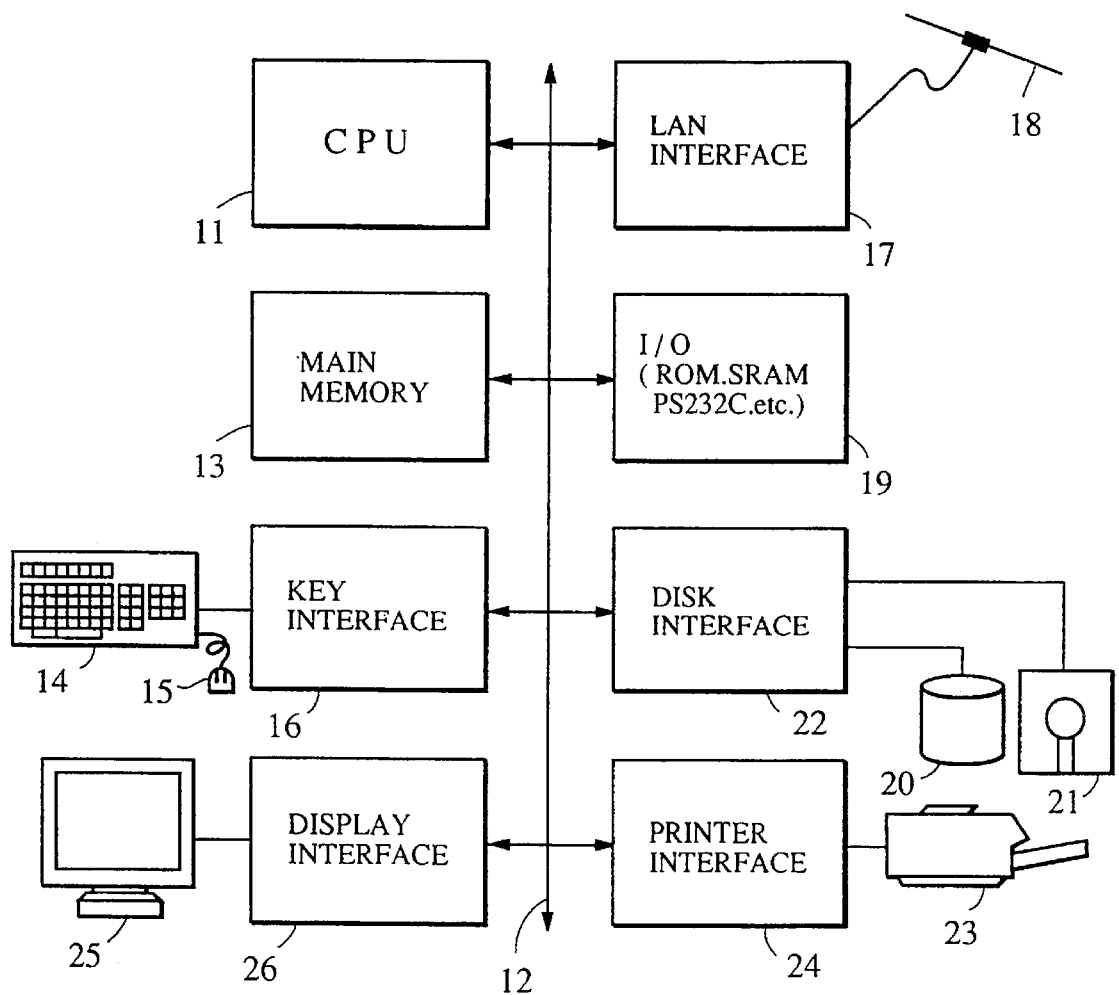
FIG. 1 is a block diagram of an embodiment of the present invention.

FIG. 1 is a block diagram of a graphics processing apparatus of the preferred embodiment of the present invention.

In FIG. 1, numeral 11 designates a CPU for controlling the apparatus as a whole; numeral 13 designates a main memory including a ROM for storing programs and the like to be executed in the CPU 11 and a RAM used as a working area in the execution; numeral 14 designates a keyboard for inputting character information such as various kinds of characters and the like, control information and the like; numeral 15 designates a mouse as a pointing device, and numeral 16 designates a key interface for connecting a signal between the keyboard 14 and mouse 15 and the apparatus; numeral 17 is a LAN interface for connecting a local area network (LAN) 18 to the apparatus; and numeral 19 designates an input/output unit (hereinafter, referred to as an I/O unit) including a ROM, RAM, RS232C type interface or the like. Various external units can be connected to the I/O unit 19. Numerals 20 and 21 designate a hard disk unit and a floppy disk unit, respectively, as an external memory device, numeral 22 designates a disk interface for connecting a signal between the hard disk unit 20 and floppy disk unit 21 and the apparatus; numeral 23 designates a printer which may be an ink jet printer, laser beam printer or the like; numeral 24 designates a printer interface for connecting a signal between the printer 23 and the apparatus; numeral 25 designates a display unit; numeral 26 designates a display interface for connecting a signal between the display unit 25 and the apparatus; and numeral 12 designates a system bus composed of a data bus, control bus and address bus for connecting a signal between the above respective units.

In general, a user operates the apparatus composed of the above respective units connected to each other in accordance with various kinds of information displayed on the display screen of the display unit 25. More specifically, characters, image information and the like supplied from the LAN 18, the external units connected to the I/O unit 19, keyboard 14, mouse 15, hard disk unit 20, and floppy disk unit 21 and operation information and the like stored in the main memory 13 and relating to the operation effected by the user are displayed on the display screen of the display unit 25, and the user makes various designations for use in information editing, using the keyboard 14 or the mouse 15, while observing the display.

Figure 2A:
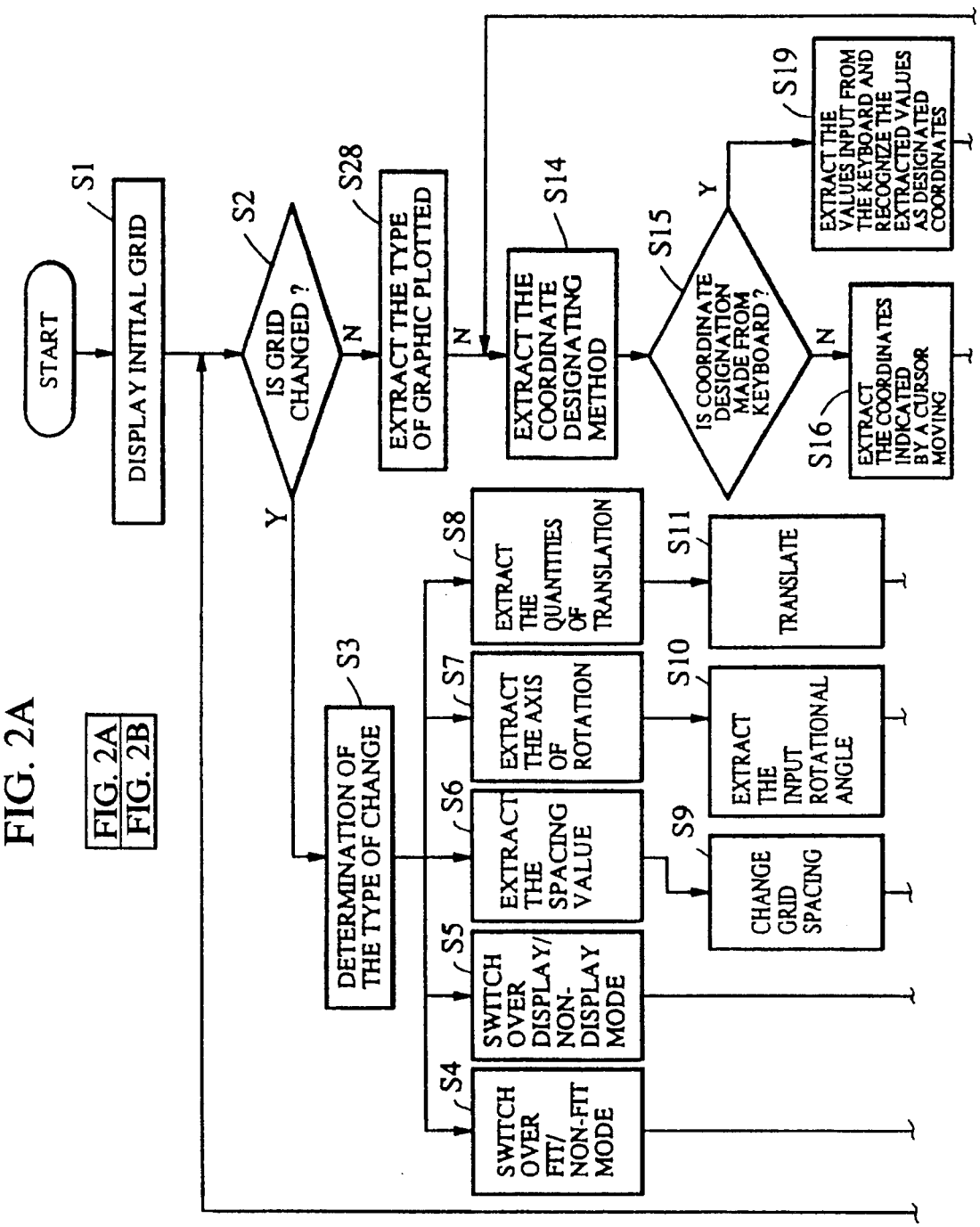
FIG. 2, consisting of FIGS. 2A and 2B, is a flowchart showing the processing operation of that embodiment of the present invention.

FIG. 2 is a flowchart showing the processing operation executed by the embodiment of FIG. 1. The processing operation of this embodiment will now be described, with reference to the flowchart shown in FIG. 2 and the displays on the display screen shown in FIGS. 3 to 9.

Figure 3:
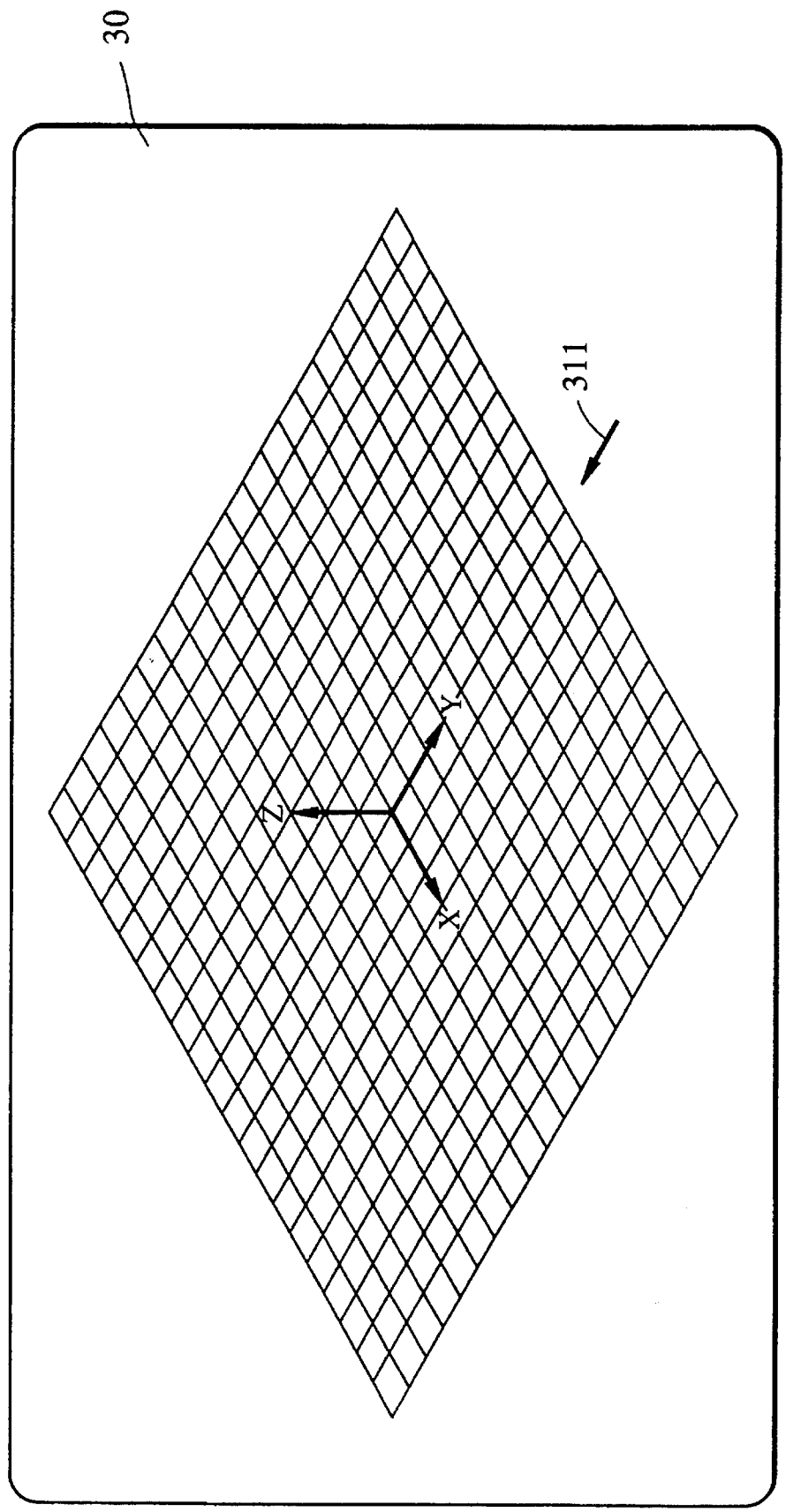
FIG. 3 is a diagram explaining a three-dimensional grid of that embodiment.

First, the start of the processing is instructed through the keyboard 14. A grid is shown on the display screen of the display unit 25 in accordance with the instruction. Here, the radial vector of the grid is directed to (x, y, z)=(1, 1, 1). FIG. 3 shows the grid displayed on the display screen of the display unit 25, wherein numeral 30 designates the display screen of the display unit 25 and numeral 311 designates a mouse cursor. The movement of the mouse cursor 311 is instructed through the mouse 15 so that it designates a desired position. Note, however that the mouse cursor 311 is not shown in the figures described hereinafter.

Next, at step S2, whether the grid is to be changed or not is determined in accordance with an input through the keyboard 14 or mouse 15, and if the grid is to be changed, a process for that purpose is executed beginning at step S3, and if not, the processing at step S28 is executed.

It is determined at step S3 whether the change of the grid is any of translation, rotation, spacing change, switching over between a display and a non-display mode, and switching over between a fit and non-fit mode. When the type of change is determined to be the translation at step S3, quantities of translation input through the keyboard 14 or mouse 15 are extracted at step S8. At step S11, the translated grid is calculated based on the quantities of translation extracted at step S8. At step S13, the grid based on the calculated value is displayed again on the display unit 25.

Figure 4:
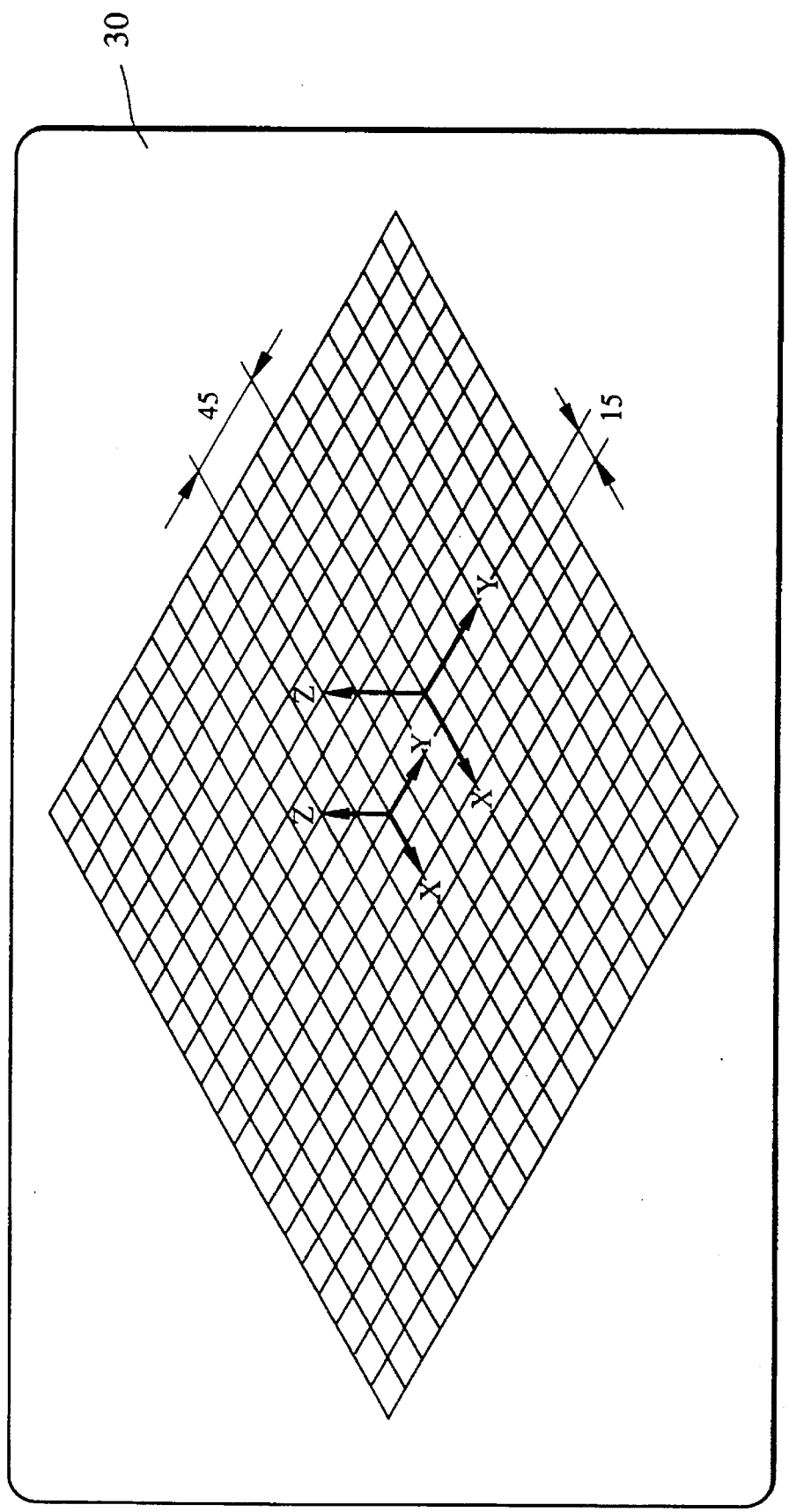
FIG. 4 is a diagram explaining a three-dimensional grid of that embodiment.

FIG. 4 shows the grid which has been subjected to the translation processing and displayed again on the display screen 30 of the display unit 25. FIG. 4 shows a state in which at X=15, Y=−45 are designated as the quantities of translation with respect to the initial grid shown in FIG. 3.

When the type of change is determined to be rotation at step S3, the axis of rotation input through the keyboard 14 or mouse 15 is extracted at step S7. Any one of the X-axis, Y-axis, Z-axis of an absolute coordinate system, the X-axis, Y-axis, Z-axis of a grid plane or an arbitrary axis may be designated as the axis of rotation. The respective X-axis, Y-axis, Z-axis may be designated by clicking a corresponding axis using the mouse 15 or by inputting the name of such axis through the keyboard 14. At that time, the color of the designated axis is changed to a color different from that of the other axes (for example, the designated axis is displayed in red, while the other axes are displayed in green).

The arbitrary axis may be designated by numerically inputting a vector through the keyboard 14 or clicking a line segment already existing on the display screen 30 using the mouse 15. At that time, when the axis is designated through the keyboard 14, a line segment corresponding to the vector is newly plotted and displayed in red and when it is designated by the clicking by the mouse 15, the color of the clicked line segment is changed to red.

At step S10, the rotational angle input through the keyboard 14 or mouse 15 is extracted. At step S12, the rotated grid is calculated based on the rotary shaft extracted at step S7 and the rotary angle extracted at step S10. At step S13, the grid based on the calculated value is displayed again on the display screen 30.

Figure 5:
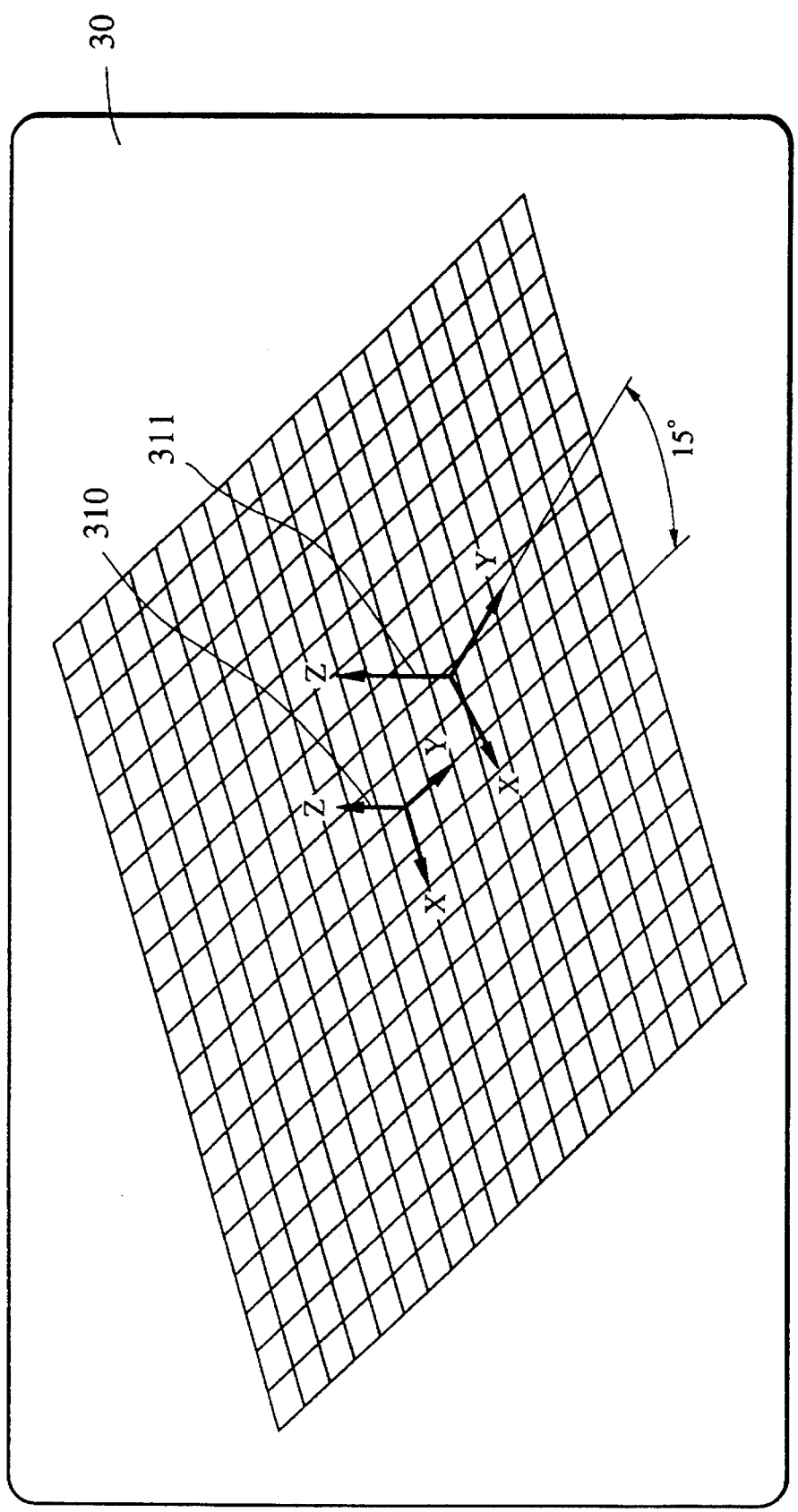
FIG. 5 is a diagram explaining a three-dimensional grid of that embodiment.

FIG. 5 shows the grid which has been subjected to the rotation processing and displayed again on the display screen 30 of the display unit 25. FIG. 5 shows the grid in a state in which the Z-axis on a grid plane coordinate system is designated as the axis of rotation with respect to the grid shown in FIG. 4 and the rotational angle is designated to be −15°. In FIG. 5, numeral 310 designates the grid plane coordinate system and numeral 311 designates an absolute coordinate system.

When the type of change is determined to be the spacing at step S3, a spacing value input through the keyboard 14 or mouse 15 is extracted at step S6. At step S9, the grid having the new spacing value is calculated based on the spacing value extracted at step S6. At step S13, the grid based on the calculated value is displayed again on the display screen 30.

Figure 6:
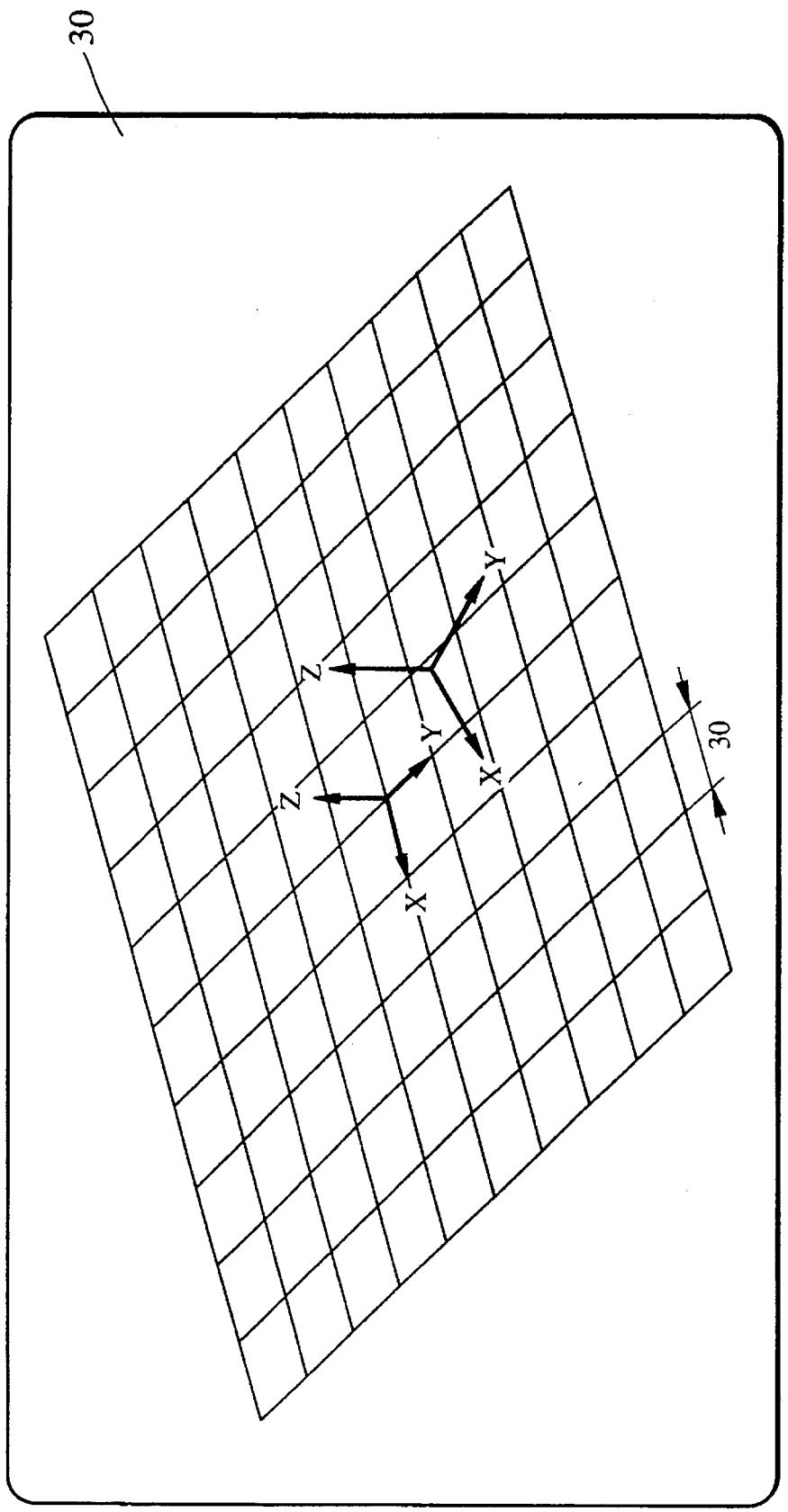
FIG. 6 is a diagram explaining a three-dimensional grid of that embodiment.

FIG. 6 shows the grid which has been subjected to the space change processing and displayed again on the display screen 30 of the display unit 25. FIG. 6 shows a state in which the grid having a grid spacing value=30 is designated after one has obtained the grid shown in FIG. 5.

When the type of change is determined to be a change between display and non-display mode at step S3, whether the system is in a display, state or a non-display state at present is determined by a display/non-display flag stored in the main memory 13 at step S5, and when it is the non-display state, the grid is displayed on the display screen 30 at step S13. When it is determined to be the display state currently by the display/non-display flag, the grid is removed from the display screen 30 at step S13. The value of the display/non-display flag stored in the main memory 13 is also changed in accordance with the change of the display.

When the type of change is determined to be a change between the fit and non-fit mode at step S3, the present state is determined by the fit/non-fit flag stored in the main memory 13 at step S4, and when the present state is a fit state, it is inverted to a non-fit state, and when the present state is in the non-fit state, it is inverted to a fit state. The value of the fit/non-fit flag stored in the main memory 13 is also changed in accordance with the change of the fit mode.

In the aforesaid, the "fit-mode" is a mode in which when a position is designated on the display screen 30 using the mouse 15, a grid point nearest to the designated point is used as a designated coordinate, whereas the "non-fit mode" is a mode in which when a position is designated on the display screen 30 using the mouse 15, the designated position is used as a designated coordinate regardless of a grid point.

When it is determined at step S2 that the grid is not to be changed, the type of elements to be plotted hereinafter is extracted from an input through the mouse 15 or keyboard 14. The type of a graphics to be plotted as a result of the extraction is stored in the main memory 13. Then, the processing at step S14 is executed. At step S14, whether the input is executed through the keyboard 14 or the mouse 15 is ascertained. At step S15, it is determined whether the coordinate designation method has been extracted at step S14 through the keyboard 14 or not, if so, the processing at step S19 is executed, while if not, the processing at step S16 is executed.

At step S19, the values input through the keyboard 14 are extracted and the extracted values are stored in the main memory 13 regardless of the grid displayed on the display screen 30 by recognizing the values as designated coordinates, as they are.

At step S16, the coordinates on the display screen 30 input through the mouse 15 are extracted. Subsequently, at step S17, whether the present state is in the grid fit mode or not is determined by the fit/non-fit flag stored in the main memory 13. When the present state is seen to be the grid fit mode as a result of the determination, the processing at step S18 is executed, and otherwise, the processing at step S20 is executed.

Figure 7:
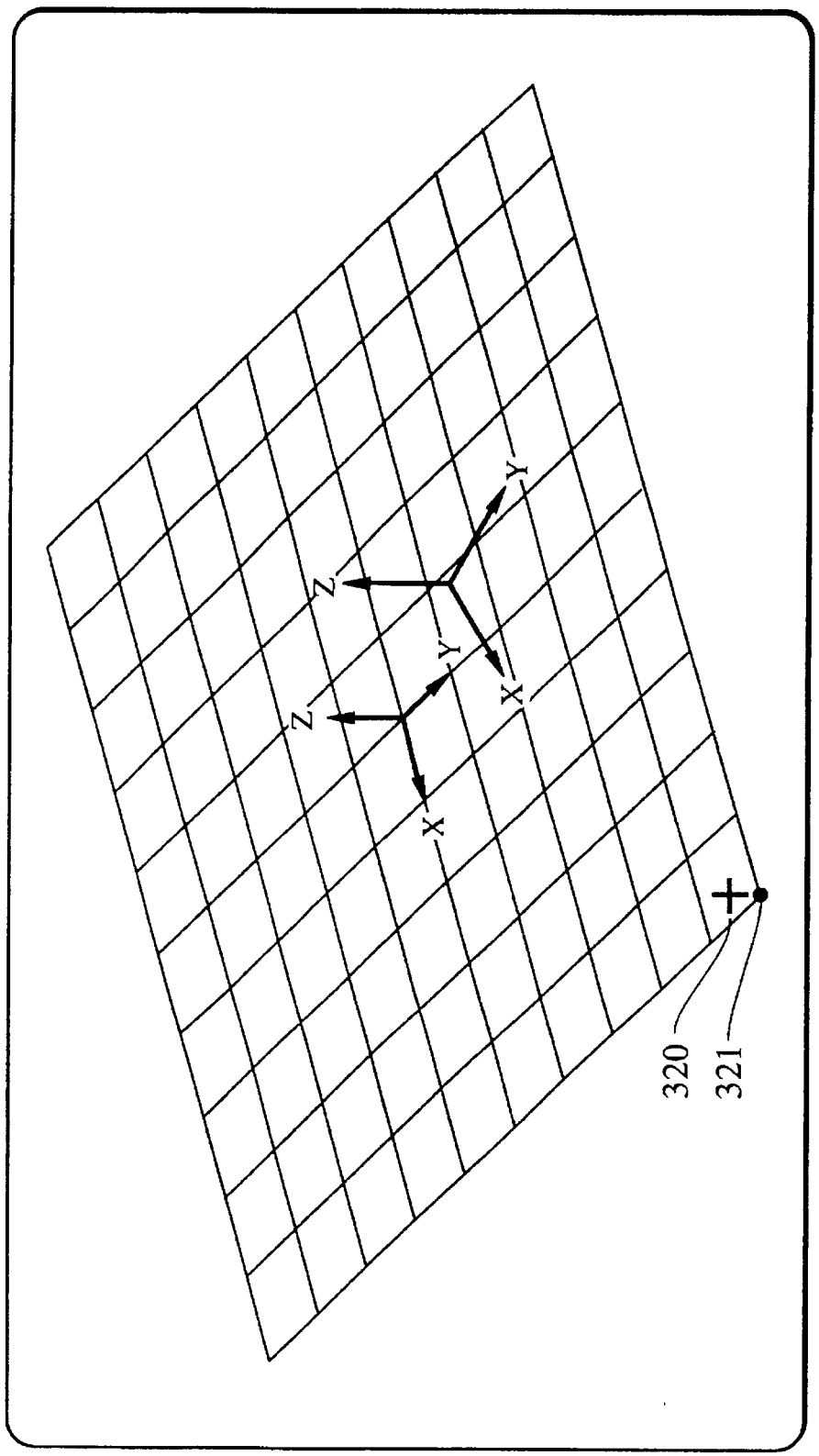
FIG. 7 is a diagram explaining a three-dimensional grid of that embodiment.

At step S18, the grid point nearest to the coordinates on the display screen 30 extracted at step S16 is calculated and the coordinates at the point are recognized as designated coordinates. FIG. 7 shows the coordinates 320 designated by the mouse 15 and the coordinates 321 calculated at step S18. The coordinates 321 in FIG. 7 are stored in the main memory 13 as the designated coordinates. At step S20, the coordinates 320 on the display unit 21 extracted at step S16 are recognized as the designated coordinates, as they are, and are stored in the main memory 13.

At step S29, the designated coordinates stored in the main memory 13 are recognized as the element points of a graphic and stored in the main memory 13. The term "element points of a graphic" means points by which the graphic can be outstandingly represented and includes the start point and end point in a line segment, the center and a point on the circumference of a circle, and the center, start point and end point of an arc.

Although these element points change depending upon the graphic to be plotted, the processing executed at step S30 refers to the type of a graphic to be plotted stored in the main memory 13 and determines whether all the element points have been designated or not, in accordance with the type of the graphics. When the element points have not all been designated, that is, for example, when the type of the graphic is a line segment and only the start point thereof has been designated, the flow returns to step S14.

Figure 8:
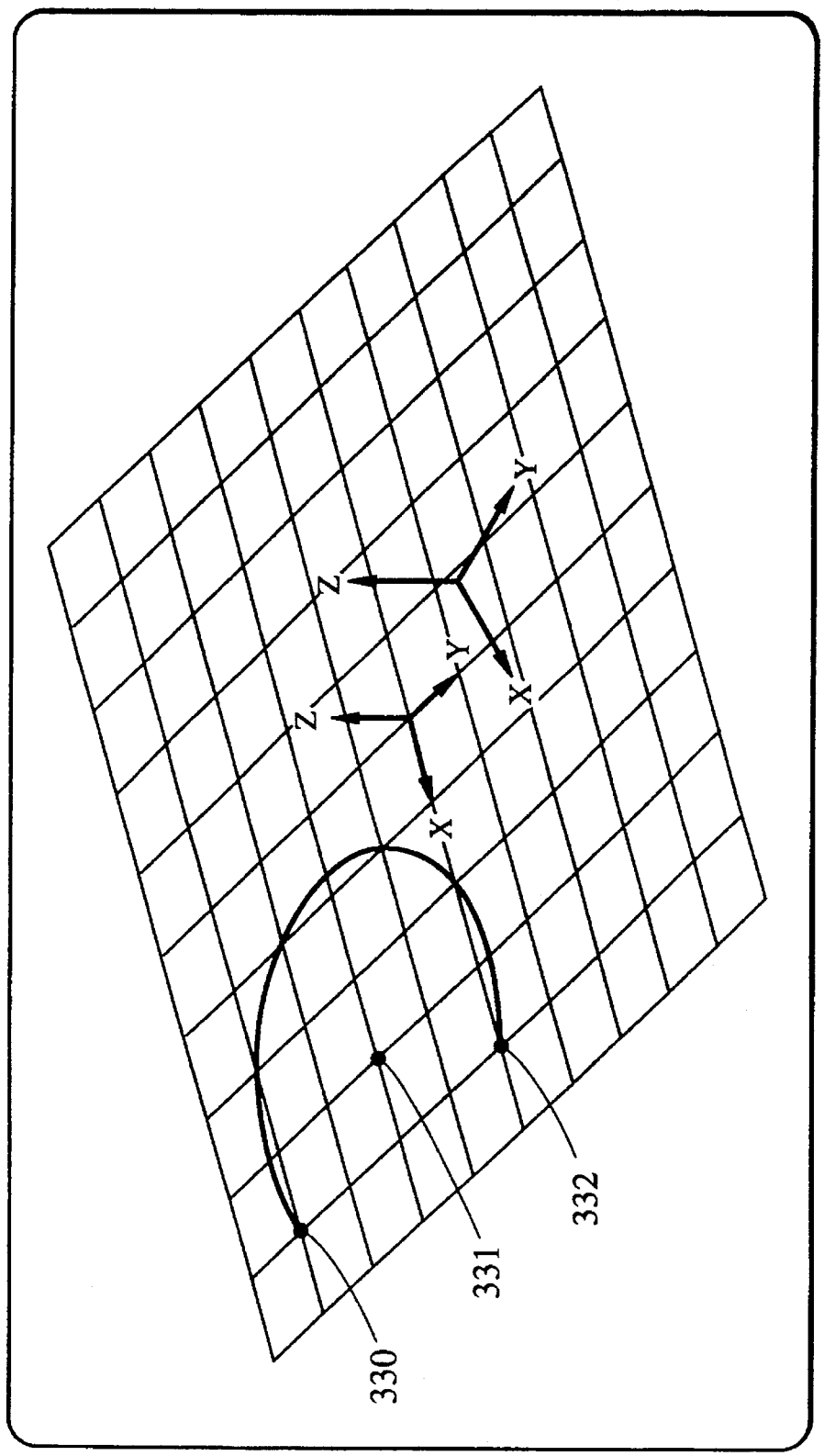
FIG. 8 is a diagram explaining a three-dimensional grid of that embodiment.
Figure 9:
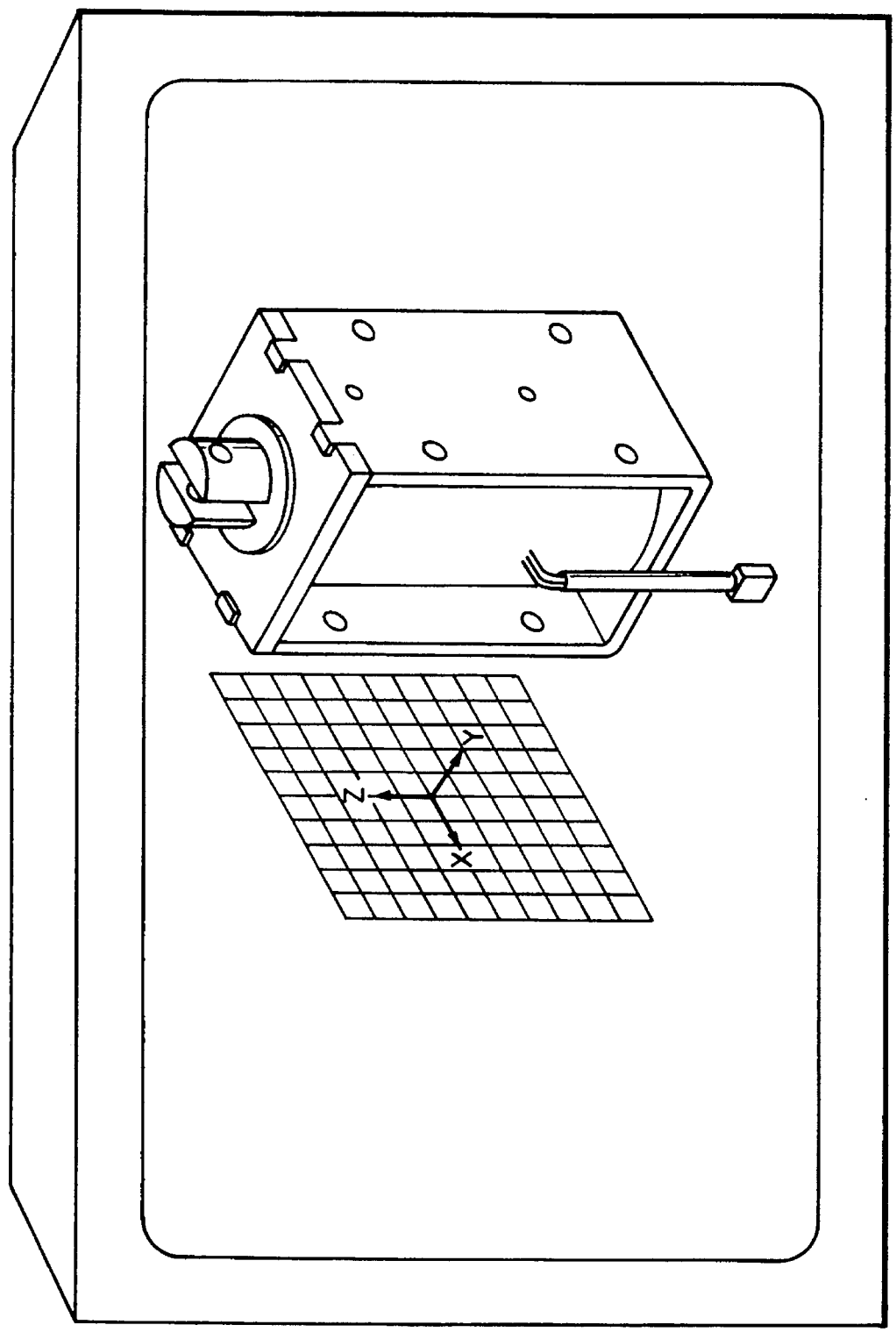
FIG. 9 is a diagram showing an example of a graphic plotted by that embodiment.

At step S31, a graphic based on the type of the graphic to be plotted and the respective element points stored in the main memory 13 is displayed on the display screen 30, and is stored in the main memory 13. FIG. 8 shows an arc plotted using the mouse 15 in the grid-fit mode and displayed on the display screen 30. In FIG. 8, the displayed arc has a center 331, start point 332, and end point 330. FIG. 9 shows an example of a three-dimensional graphic plotted by using this embodiment.

Figure 11:
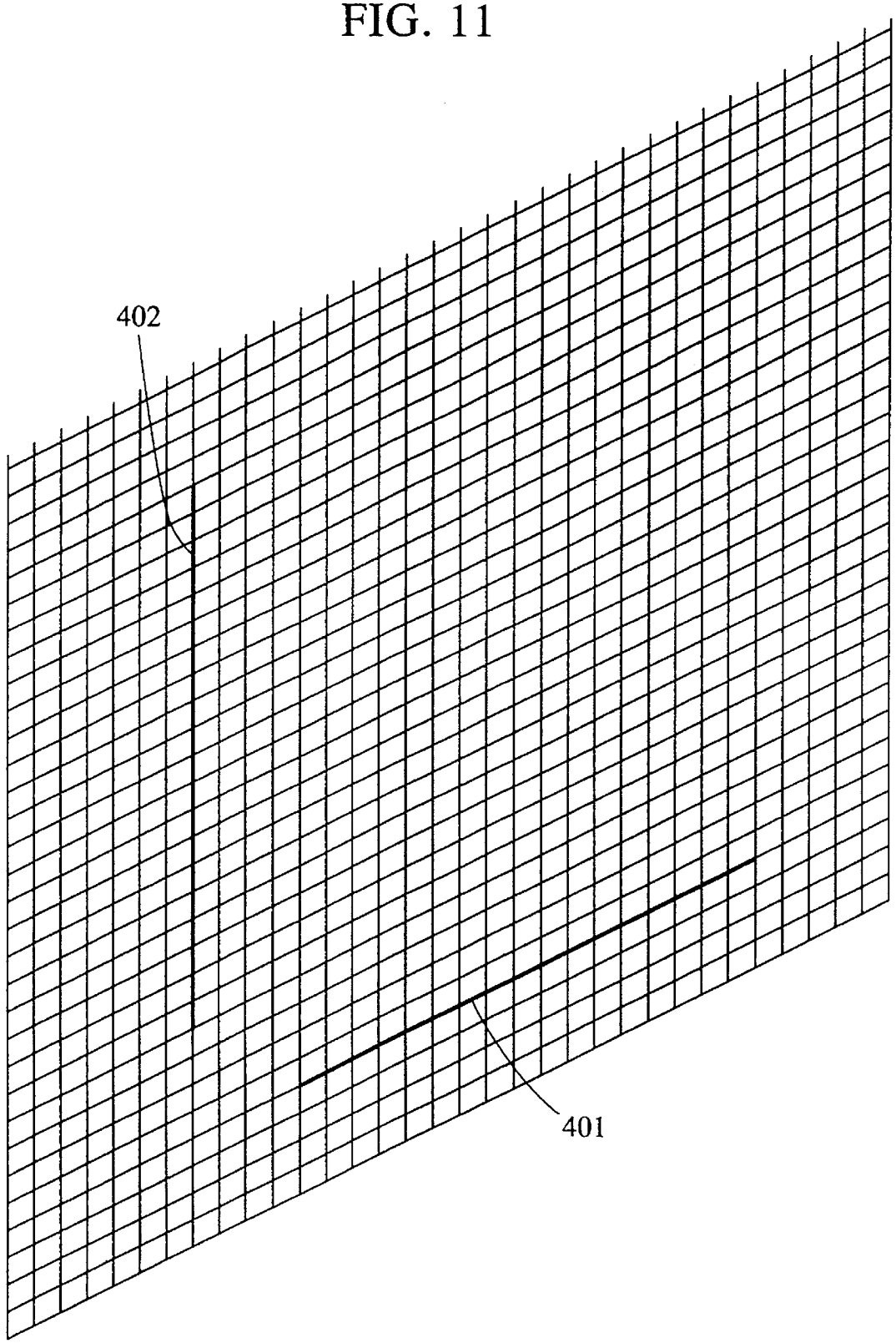
FIG. 11 is a diagram showing a corner processing executed by that embodiment.
Figure 12:
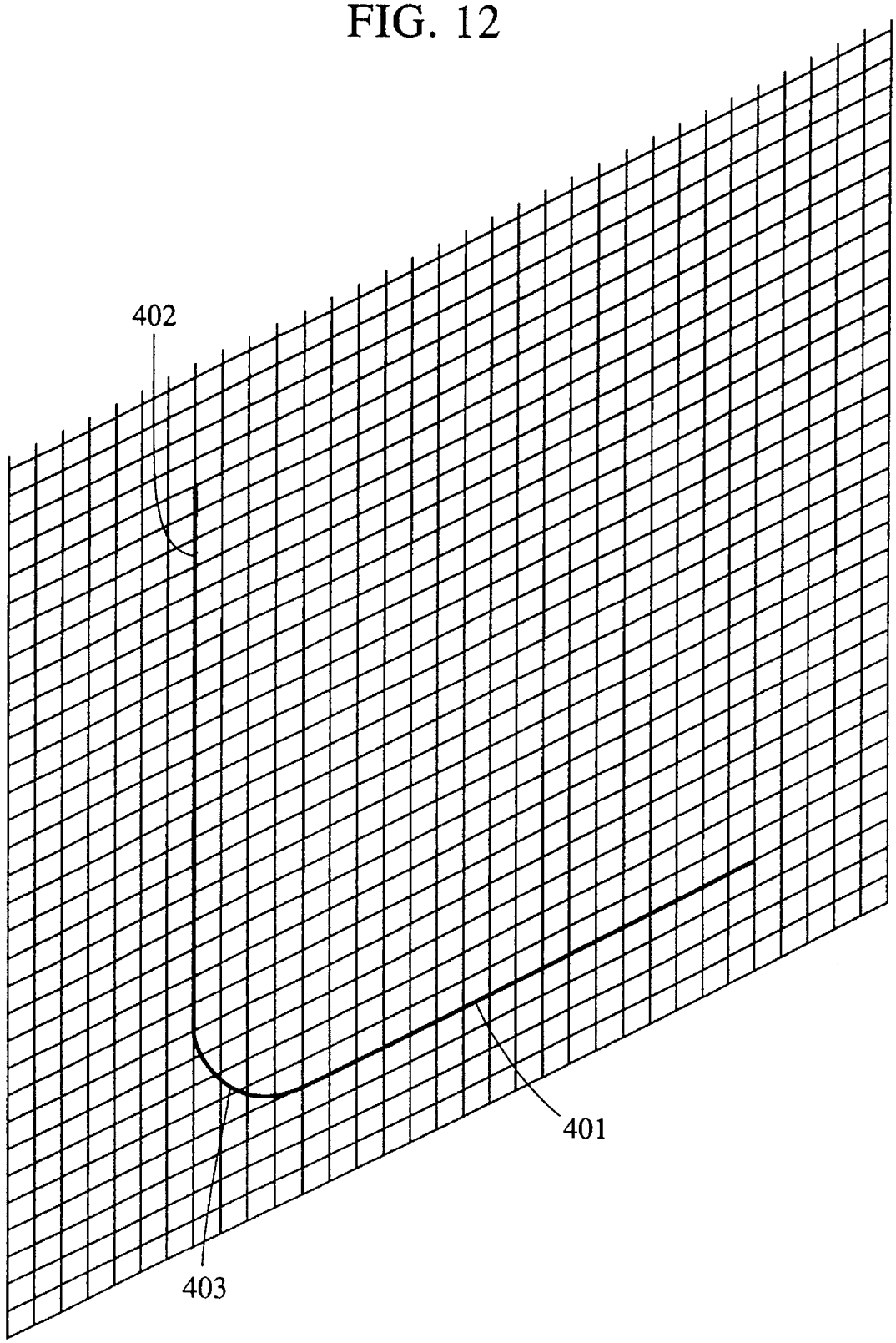
FIG. 12 is a diagram showing a corner processing executed by that embodiment.

Next, an arc processing at a corner will be described with reference to the flowchart of FIG. 10, and to FIGS. 11 and 12.

Figure 10:
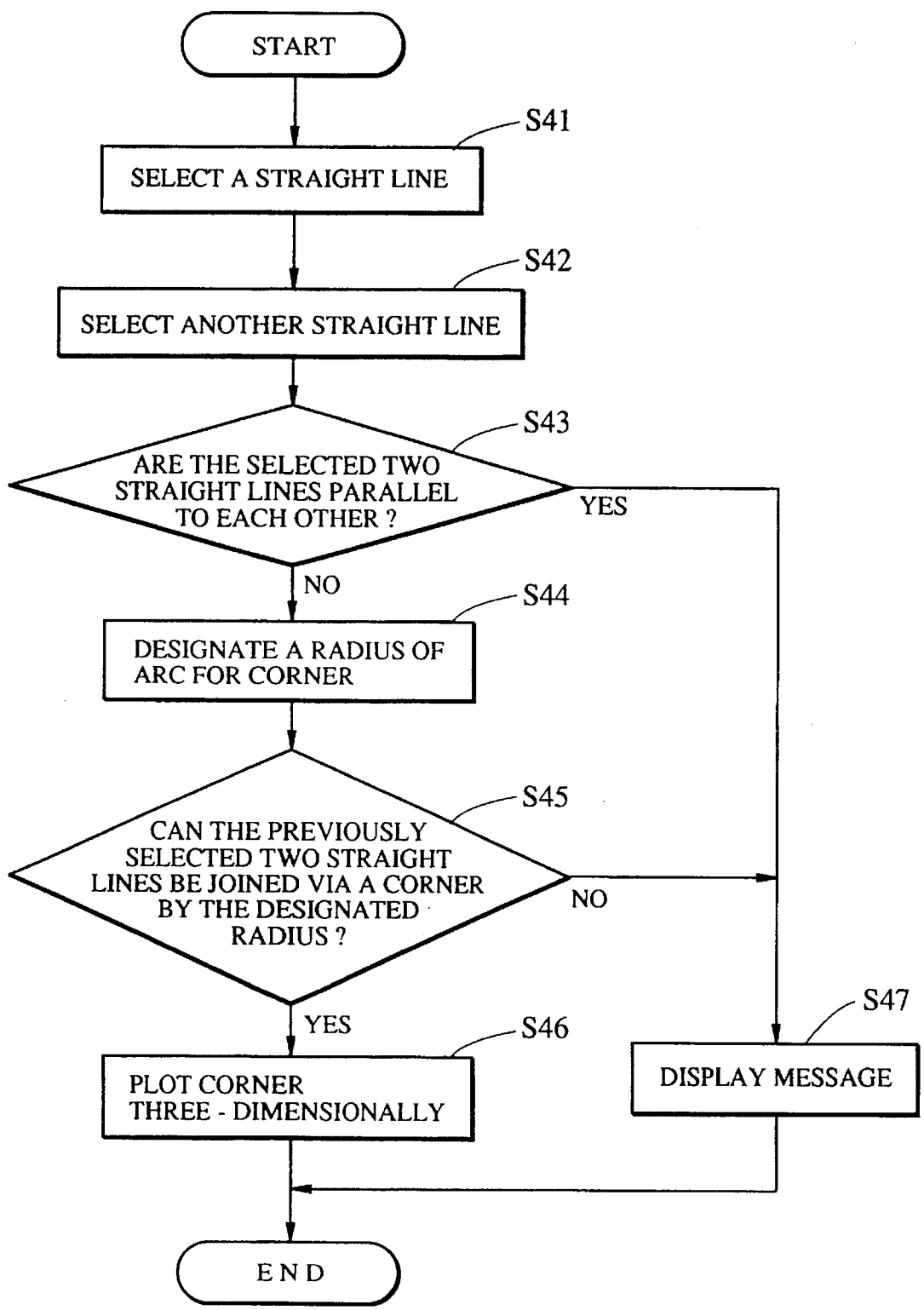
FIG. 10 is a flowchart showing a corner processing executed by that embodiment.

FIG. 10 is a flowchart showing an arc processing operation on the corner.

It is assumed by way of example that the grid on an XY plane is displayed on the display screen 30. First, straight lines 401, 402 are plotted on the grid by using the mouse 15. Next, the straight line 401 is selected (step S41) and then the other straight line 402 is selected (step S42). When these two straight lines are selected, it is determined whether they are parallel to each other or not (step S43). When they are not parallel to each other, the radius of an arc with which a corner is plotted for these two straight lines is designated by inputting a numerical value through the keyboard 14 (step S44). It is determined whether or not the designated arc can plot a corner for the two selected straight lines 401, 402 (step S45), and when it is determined that the corner can be plotted, the corner is plotted on the surface of the grid being processed with the arc (step S46).

Figure 13:
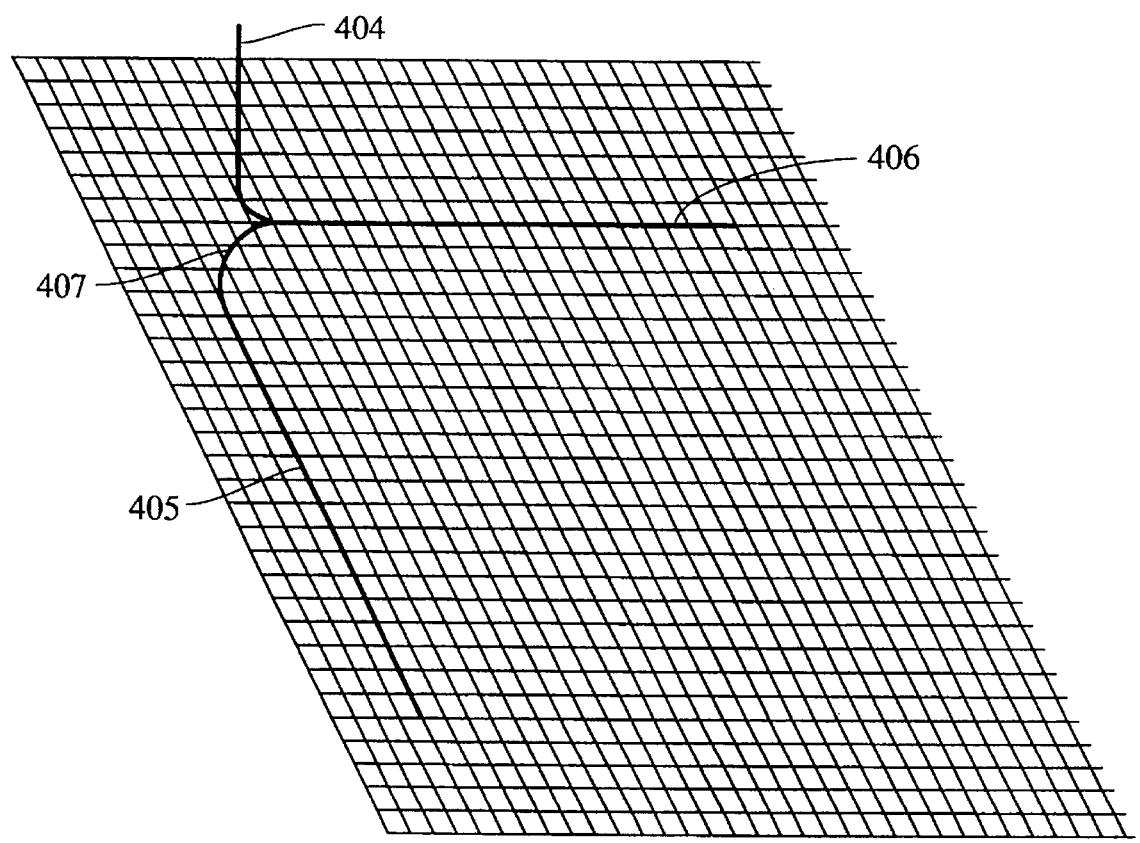
FIG. 13 is a diagram showing a corner processing executed by that embodiment.

When the two straight lines selected are determined to be parallel to each other at step S43, or when the corner is determined to be difficult to plot at step S45, a message indicating either such determination is displayed on the display screen 30 (step S47). For example, when the straight lines 401 and 402 are selected as shown in FIG. 11 and then the radius of the arc for plotting the corner is designated, the corner (i.e., the portion 403) is plotted as shown in FIG. 12. The corner cannot be plotted, for example, in a case where the two straight lines are excessively apart from each other and cannot be connected by the arc having the designated radius, etc. More specifically, according to the present invention, when the radius of an arc for plotting a corner is designated, a two-dimensional arc is not displayed, but rather, a three-dimensional arc is plotted on the surface of the grid being processed. Further, as shown in FIG. 13, a corner (i.e., the portion 407) can be plotted in such a manner that the grid plane is changed to the XY plane with respect to the line segments plotted as described above, and the same processing is executed by designating straight lines 405 and 406.

Figure 15:
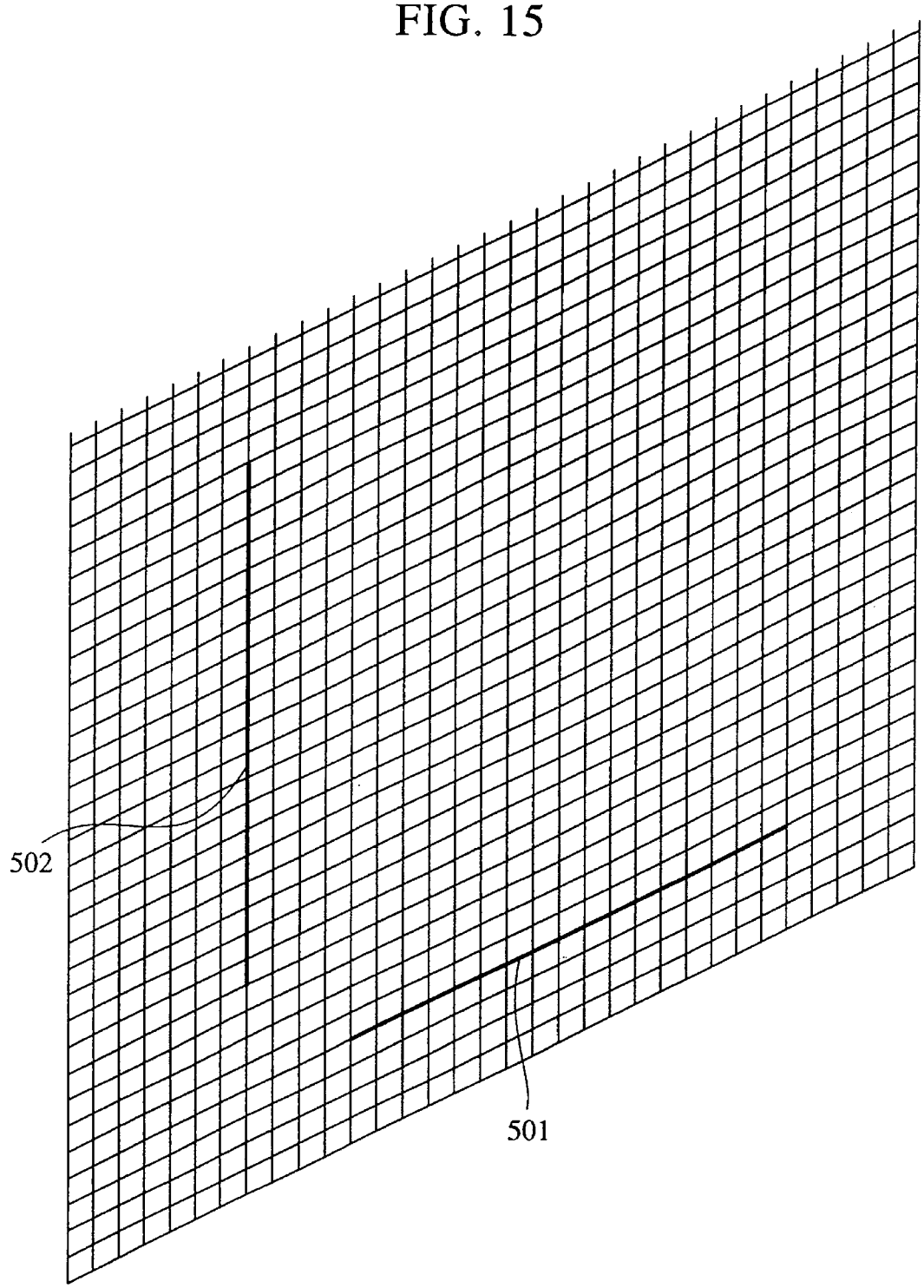
FIG. 15 is a diagram showing a corner processing executed by that embodiment.
Figure 16:
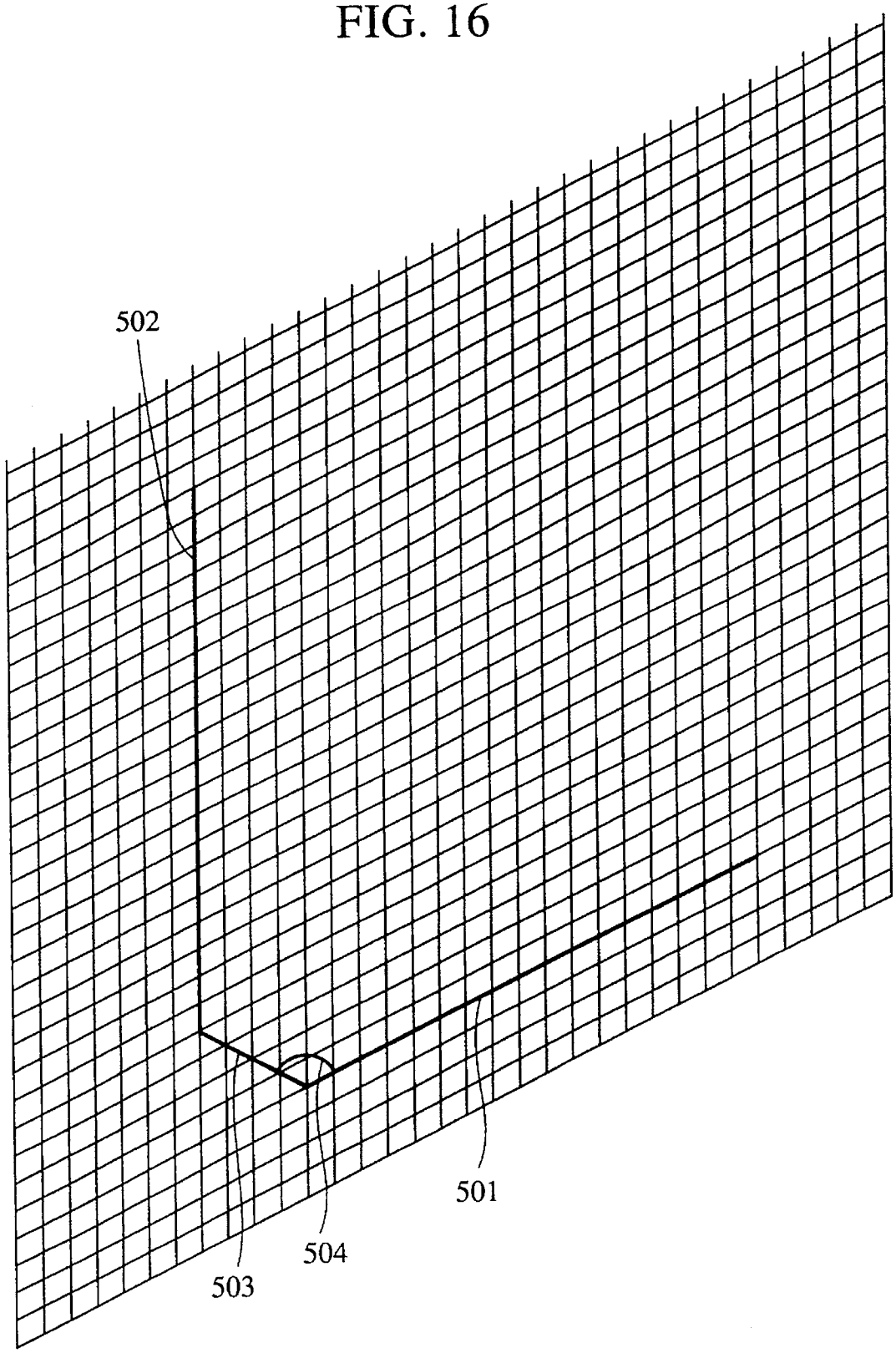
FIG. 16 is a diagram showing a corner processing executed by that embodiment.

Next, a straight line processing for a corner will be described with reference to the flowchart of FIG. 14, and to FIGS. 15 and 16.

Figure 14:
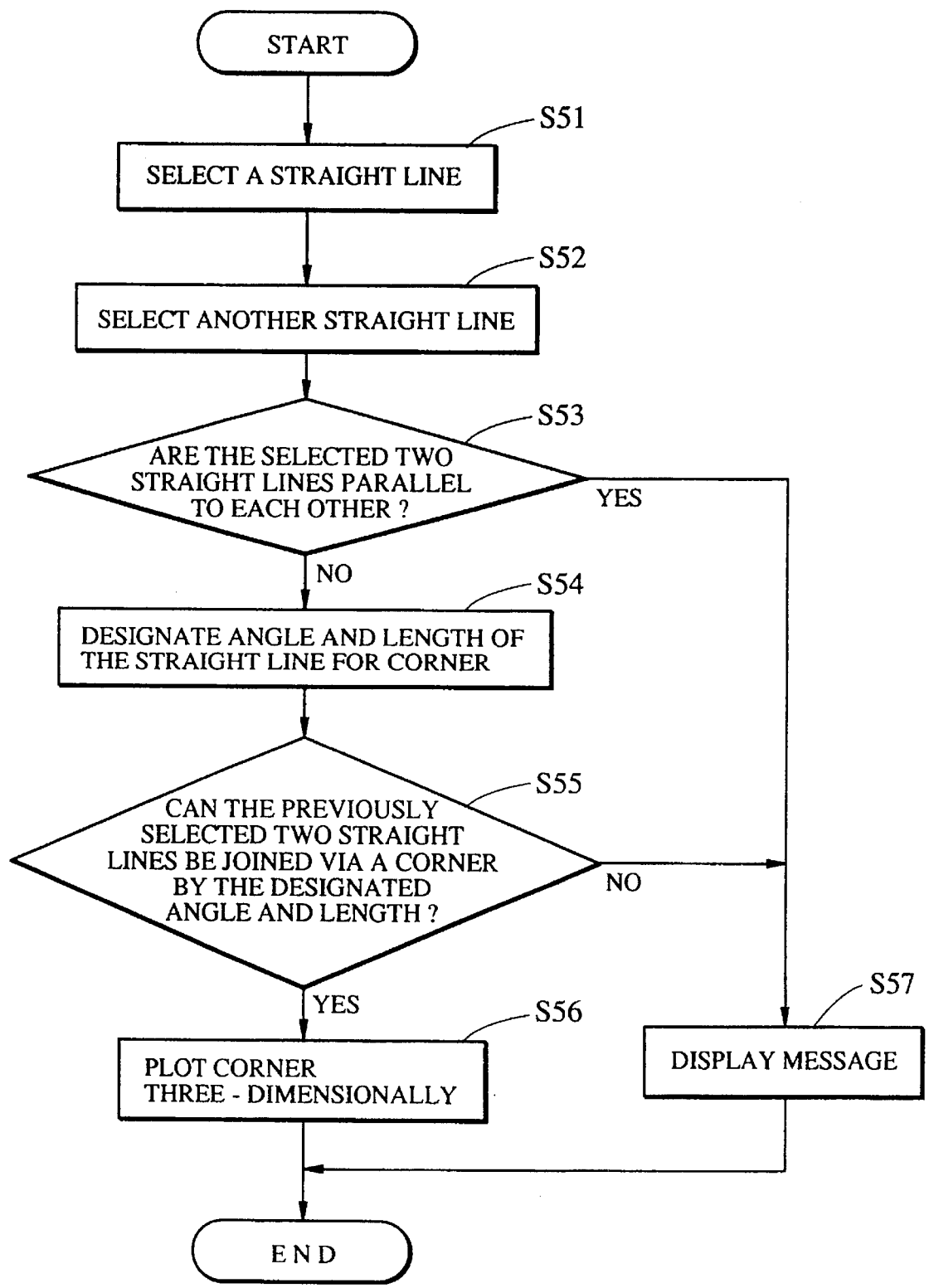
FIG. 14 is a flowchart showing another corner processing executed by that embodiment.

FIG. 14 is a flowchart showing a straight line processing operation on a corner.

It is assumed for purposes of explanation that the grid on an XY plane is displayed on the display screen 30. First, straight lines 501, 502 are plotted by using the mouse 15. Next, the straight line 501 is selected (step S51) and then the other straight line 502 is selected (step S52). When these two straight lines 501, 502 are selected, it is determined whether they are parallel to each other or not (step S53). When they are not parallel to each other, the angle of a straight line to the grid surface being processed and the length of the above straight line with which a corner is plotted for these two straight lines, are designated (step S54). It is determined whether or not the designated straight line can plot the corner for the two straight lines selected previously (step S55), and when it is determined that the corner can be plotted, the corner is plotted with the straight line on the surface of the grid being processed (step S56).

When the two straight lines selected are determined to be parallel to each other at step S53 or when the corner is determined to be difficult to plot at step S55, a message indicating either such determination is displayed on the display screen 30 (step S57). As shown in FIG. 15, when, for example, the straight lines 501 and 502 are selected and then the angle and length of the straight line for plotting the corner, the corner (i.e. a straight line 503) is plotted as shown in FIG. 16. The "angle of the straight line" means, for example, the angle between the straight line 501 and the straight line 503 as shown in FIG. 16, and the "length" means the length of the straight line 503. Therefore, whether a corner can be plotted for the straight lines 501 and 502 can be determined by setting the angle and length. More specifically, according to the present invention, a three-dimensional straight line can be plotted on the grid plane being processed by designating the angle and length of a straight line to be plotted as a corner to the grid plane being processed.

As described above, according to this embodiment, a three-dimensional grid can be easily set. Further, a three-dimensional graphic can be easily plotted by using the three-dimensional grid. Furthermore, a three-dimensional corner can be easily plotted.

As described above, the graphics processing apparatus according to the present invention has an effect to easily plot a three-dimensional graphic.

What is claimed is:

1. A graphics processing apparatus for plotting a graphic by using a grid, comprising:

a grid display means for causing display of the grid of an XY plane, YZ Plane or ZX plane on a display means;

plotting means for plotting a graphic by using the displayed grid;

changing means for changing a plane of the displayed grid to a grid of another plane, and plotting the graphic again, by using the grid of the other plane; and display control means for controlling said apparatus to display the graphic, as plotted by said plotting means, and the graphic, as plotted again, on the same display screen.

2. A graphics processing apparatus according to claim 1, wherein the change executed by said changing means is a translation of the grid.

3. A graphics processing apparatus according to claim 1, wherein the change executed by said changing means is a change of a grid spacing.

4. A graphics processing apparatus according to claim 1, wherein the change executed by said changing means is a rotation of the grid about a designated axis.

5. A graphics processing apparatus according to claim 1, wherein the change executed by said changing means is a selection as to whether the grid is to be displayed or not.

6. A graphics processing apparatus according to claim 1, wherein the change executed by said changing means is a selection as to whether the graphic plotted by said plotting means is to be caused to coincide with points of the grid or not.

7. A graphics processing apparatus according to claim 1, further comprising:

a grid change means for changing the grid displayed on the display means; and a graphics plot means for plotting the graphics using the changed grid.

8. A graphics processing method, to be performed using an apparatus, comprising the steps of:

causing display of the grid of an XY plane, YZ plane or ZX plane on a display means;

plotting a graphic by using the displayed grid;

changing a plane of the displayed grid to a grid of another plane, and plotting the graphic again, by using the grid of the other plane; and controlling the apparatus to display the graphic, as plotted in said plotting step, and the graphic, as plotted again, on the same display screen.

9. A graphics processing method according to claim 8, further comprising the steps of:

changing the grid displayed on the display means; and plotting the graphics using the changed grid.

10. A graphics processing method according to claim 9, wherein the change of the grid is a translation thereof.

11. A graphics processing method according to claim 9, wherein the change of the grid is a change of a grid spacing.

12. A graphics processing method according to claim 9, wherein the change of the grid is a rotation thereof about a designated axis.

13. A graphics processing method according to claim 9, wherein the change of the grid is a selection as to whether the grid is to be displayed or not.

14. A graphics processing method according to claim 9, wherein the change of the grid is a selection as to whether the reference points of the graphic plotted in said plotting step are to be caused to coincide with points of the grid.

15. A graphics plotting apparatus, comprising:

a display control means for causing display of one grid of a plurality of grids on a display means;

a line segment plot means for plotting line segments on the displayed grid;

a line segment selection means for selecting two line segments from among line segments plotted by using respective grids;

a type selection means for selecting a type of processing; and a processing means for plotting a corner for the selected line segments using the type of processing selected by said type selection means.

16. A graphics plotting apparatus according to claim 15, wherein the types of processing available for selection by said type selection means include an arc processing for a corner.

17. A graphics plotting apparatus according to claim 16, further including a value designation means for designating a radius, wherein said processing means executes corner processing based on the designated radius.

18. A graphics plotting apparatus according to claim 15, wherein the types of processing available for selection by said type selection means include a straight line processing for a corner.

19. A graphics plotting apparatus according to claim 18, further including a value designation means for designating a length and an angle, wherein said processing means executes corner processing based on the designated length and angle.

20. A storage medium storing a program which, when loaded into a programmable apparatus, causes the apparatus to perform a graphics processing method comprising the steps of:

causing display of the grid of an XY plane, YZ plane or ZX plane on a display means;

plotting a graphic by using the displayed grid;

changing a plane of the displayed grid to a grid of another plane, plotting the graphic again, by using the grid of the other plane; and controlling to display the graphic, as plotted in said plotting step, and the graphic, as plotted again, on the same display screen.

* * * * *

UNITED STATES PATENT AND TRADEMARK OFFICE
CERTIFICATE OF CORRECTION

PATENT NO. : 5,621,865

DATED : April 15, 1997

INVENTOR(S) : NAOKI IWAMOTO

Page 1 of 2

It is certified that error appears in the above-identified patent and that said Letters Patent is hereby corrected as shown below:

[56] REFERENCES CITED

Publications
  Under "Evolution Computing": "119-119," should read
    --118-119,--.

COLUMN 1

Line 45, "graphics" should read --graphic--.

COLUMN 3

Line 40, "however" should read --however,--.
Line 67, "may" should read --may be--.

COLUMN 4

Line 45, "display," should read --display--.

COLUMN 5

Line 6, "graphics" should read --graphic--.
Line 12, "not," should read --not;--.

UNITED STATES PATENT AND TRADEMARK OFFICE
CERTIFICATE OF CORRECTION

PATENT NO. : 5,621,865

DATED : April 15, 1997

INVENTOR(S): NAOKI IWAMOTO

It is certified that error appears in the above-identified patent and that said Letters Patent is hereby corrected as shown below:

<u>COLUMN 7</u>

Line 25, "YZ Plane" should read --YZ plane--.

Signed and Sealed this

Fourth Day of November, 1997

Attest:

BRUCE LEHMAN

Attesting Officer                    Commissioner of Patents and Trademarks